Patented Jan. 21, 1930

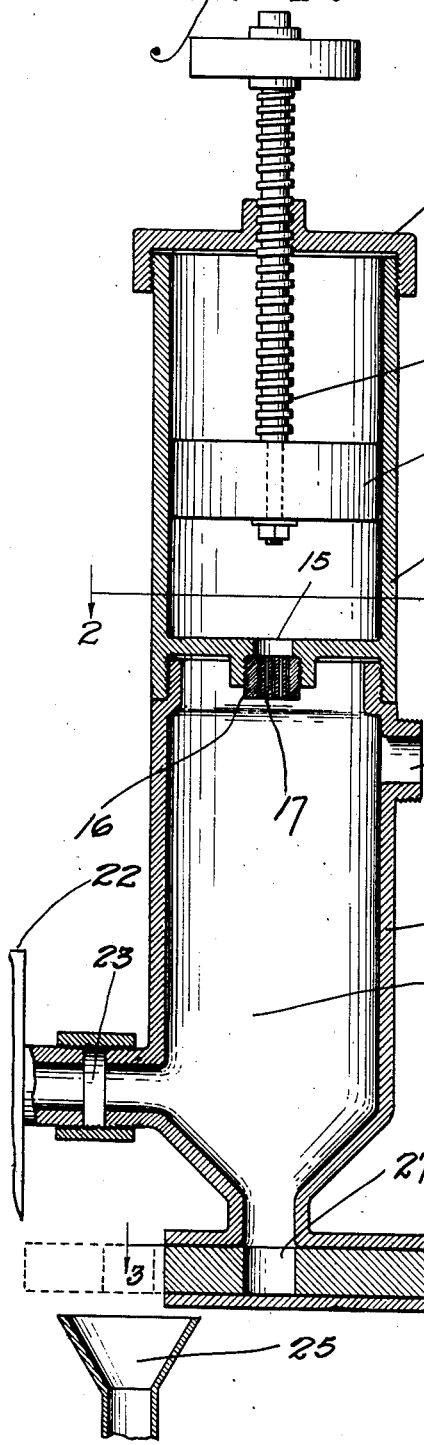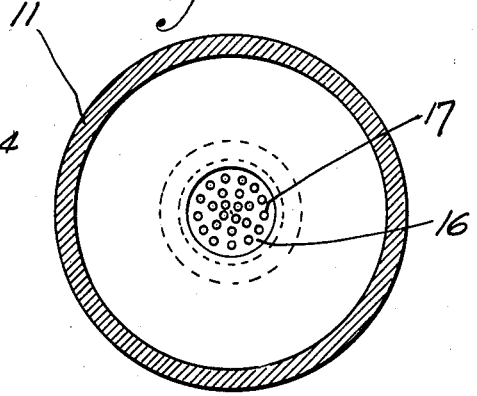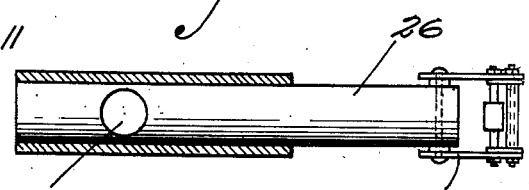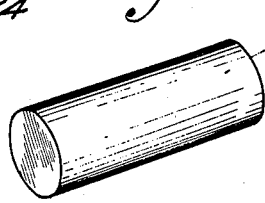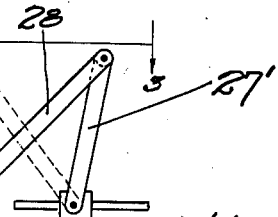

1,744,610

UNITED STATES PATENT OFFICE

ROBERT O. BOYKIN, OF LOS ANGELES, CALIFORNIA

METHOD OF REFINING OIL, REFINING AGENT THEREFOR, AND METHOD OF PRODUCING SAME

Application filed April 30, 1924. Serial No. 710,026.

My invention relates to the art of removing impurities from a liquid by means of a solid and porous reagent, which is brought into intimate contact therewith. A particular application of my invention is made in the refining of mineral oils. In such refining, it is common practice to treat an oil or a distillate thereof with suitable acids or other reagents and to thereafter remove impurities from the oil or distillate, whether formed by the acid treatment or previously present, by means of various filtering and decolorizing agents such as fuller's earth, various clays, infusorial, or diatomaceous earths or equivalent substances. These earths, which will hereinafter be referred to under the broad term "decolorizing clays," may be mixed with the oil during agitation, being subsequently removed by filtration, or the oil may be forced through filters containing such earths. In the following discussion, fuller's earth will be taken as typical of all these equivalents.

In the decolorizing of the lubricating oil, for example, it is common practice to agitate it with fuller's earth. If the fuller's earth in its natural form, is mixed with the oil, very fine particles will be introduced into the oil which form a slime in the filter and rapidly cause it to clog up. It has become common practice, therefore, to screen the fuller's earth before introducing it into the oil, eliminating all the particles larger than 60 mesh and all the particles smaller than 100 mesh. Even, however, where the fuller's earth is carefully screened, considerable quantities of slime are formed, due to the fact that the particles which pass the screen have adhering to them fine particles which become detached in the oil and produce the undesirable slimes.

It is an object of my invention to provide a process in which fuller's earth, or the like, is utilized for the decolorizing and refining of various liquids such as lubricating oil, and in which the fuller's earth is introduced into the oil in the form of definite sized particles which are produced artificially. Further objects and advantages will be made evident hereinafter.

Referring to the drawing which is for illustrative purposes only,

Fig. 1 shows one form of apparatus by which particles having the desired characteristics may be produced.

Fig. 2 is a section on a plane represented by the line 2—2 of Fig. 1.

Fig. 3 is a section on a plane represented by the line 3—3 of Fig. 1.

Fig. 4 is a perspective view on an enlarged scale of one form of particle.

Fig. 5 is a similar view of an alternate form of particle.

In the practice of my invention, the fuller's earth is preferably first roughly dried, and is then passed through a screen to remove the large particles of fuller's earth, or other substances therefrom and is then mixed with water to form a smooth plastic mass. This mass is placed in a cylinder 11 and is subjected to pressure by means of a piston 12, this piston being operated by a screw 13 threaded in a cover 14 and turning in the piston 12. An opening 15 is provided in the bottom of the cylinder and a die 16 is secured therein, this die having small holes 17 extending therethrough. These holes may be circular, flattened, or of any desired shape. The plastic material is forced through these holes into a drying chamber 20 formed inside a wall 21. The drying chamber is supplied with hot air from a heater 22 through a pipe 23, the air leaving the drying space 20 through an opening 24. The plastic material leaving the die 17 is in the form of very small strings which rapidly dry in the highly heated atmosphere of the drying chamber 20, the dried material breaking into irregular lengths and falling into the bottom of the drying chamber 20. This material is removed from the drying chamber and delivered into a hopper 25 by means of a reciprocating slide 26, this slide having an opening 27 into which the material falls and from which it falls into the hopper 25. The slide 26 is operated by a crank 27' and a connecting rod 28. The finished material may be in the form of small cylinders 29, as shown in Fig. 4, or small flat particles 30, as shown in Fig. 5. In practice, the cylinders 29 may be slightly over 1/64 of an inch in diameter and the flat particles 30 may be something less than 1/64 inch in thickness. The length of the particles 29 and 30 is not important as they may vary from 1/64 inch to one inch or more in length without in any way interfering with their efficiency. The water acts as a binder to initially hold the particles together, the compression in the die forcing the material together in such a manner that it retains its shape after most of the water has been removed by drying. In treating materials other than oil, some other binder than water may be necessary, the binder preferably being insoluble in the material to be treated. The particles 29 and 30, when introduced into the oil, act as ordinary decolorizing clays or fuller's earth would upon the oil, tending to improve its color and odor and increase its commercial value. The small particles may be readily removed from the oil after agitation by an ordinary filter and are of such size that they will not clog the filter by sliming. These small particles also form an ideal filtering medium for use in such a filter, as they are of sufficiently large size to leave open passages through the filter, and are sufficiently small to provide a very large filtering surface.

I claim as my invention:

1. A decolorizing material consisting of a mass of artificially produced particles of decolorizing clay, having a high affinity for the impurities in oils, these particles all having uniform areas of cross-section but different lengths, the largest cross sectional dimension being about one-sixty-fourth of an inch.

2. A method of preparing decolorizing clays for use in oil refining which comprises: selecting a decolorizing clay having a high affinity for the impurities in the oils to be refined; mixing particles of said clay with a binding material to form a plastic mass; and forcing said plastic mass through an opening to produce strings of said material of uniform cross section but indefinite length.

3. A method of preparing decolorizing clays for use in oil refining which comprises: selecting a decolorizing clay having a high affinity for the impurities in the oils to be refined; mixing particles of said clay with a binding material to form a plastic mass; and molding said plastic mass to form bodies of the material having one dimension of about one-sixty-fourth of an inch.

In testimony whereof, I have hereunto set my hand at Los Angeles, California, this 10th day of April, 1924.

ROBERT O. BOYKIN.